(12) United States Patent
Robertson et al.

(10) Patent No.: US 12,496,644 B2
(45) Date of Patent: Dec. 16, 2025

(54) BURR

(71) Applicant: ATA TOOLS LIMITED, Cavan (IE)

(72) Inventors: Peter Robertson, Dublin (IE); Paul Gaffney, Cavan (IE); John Hetherton, Meath (IE)

(73) Assignee: ATA Tools Limited (IE)

( * ) Notice: Subject to any disclaimer, the term of this patent is extended or adjusted under 35 U.S.C. 154(b) by 482 days.

(21) Appl. No.: 17/909,453

(22) PCT Filed: Mar. 5, 2021

(86) PCT No.: PCT/EP2021/055620
§ 371 (c)(1),
(2) Date: Sep. 6, 2022

(87) PCT Pub. No.: WO2021/176069
PCT Pub. Date: Sep. 10, 2021

(65) Prior Publication Data
US 2023/0158583 A1 May 25, 2023

(30) Foreign Application Priority Data
Mar. 6, 2020 (DE) ..................... 10 2020 106 105.6

(51) Int. Cl.
*B23C 5/10* (2006.01)

(52) U.S. Cl.
CPC ........ *B23C 5/10* (2013.01); *B23C 2210/0457* (2013.01); *B23C 2210/326* (2013.01)

(58) Field of Classification Search
CPC .............. B23C 5/10; B23C 2210/0492; B23C 2210/241; B23C 2210/287;
(Continued)

(56) References Cited

U.S. PATENT DOCUMENTS 2,855,657 A * 10/1958 Erhardt ..................... B23C 5/04
407/115
4,174,915 A * 11/1979 Peetz ........................ B23C 5/10
407/59
(Continued)

FOREIGN PATENT DOCUMENTS

CN         106270700 A     1/2017
DE         299 12 978 U1   11/1999
(Continued)

OTHER PUBLICATIONS

Office Action issued by the Mexican Patent Office issued Jul. 29, 2025.

*Primary Examiner* — Nicole N Ramos
(74) *Attorney, Agent, or Firm* — Steve LeBlanc, LLC

(57) ABSTRACT

A burr includes a shaft portion and a milling portion. Cutters are separated by main flutes having a main flute depth. The cutters extend helically at a first twist angle. Each cutter has a cutting edge between a rake face and a relief face. The rake face forms a rake angle, and the relief face forms a relief angle. Chip breakers in each relief face have a chip breaker depth. At the largest diameter of the milling portion, the chip breaker depth is between 5 and 25 percent of the main flute depth, the rake angle is between −3 degrees and +14 degrees, the relief angle is between 10 degrees and 20 degrees, the first twist angle is greater than 25 degrees, and the number of main flutes is less than 15.

21 Claims, 3 Drawing Sheets

(58) Field of Classification Search
CPC ........ B23C 2210/326; B23C 2210/402; B23C 2210/405; B23C 2210/407; B23C 2226/27
See application file for complete search history.

(56) References Cited

U.S. PATENT DOCUMENTS

| | | | | |
|---|---|---|---|---|
| 4,721,421 | A * | 1/1988 | Klinger | B23C 5/10 407/54 |
| 9,884,376 | B2 * | 2/2018 | Huth | B23C 5/10 |
| 2005/0123363 | A1 * | 6/2005 | Ahrnkiel | B23C 5/10 407/53 |
| 2007/0098506 | A1 * | 5/2007 | Flynn | B23C 5/10 407/53 |
| 2009/0136308 | A1 * | 5/2009 | Newitt | B23C 5/10 407/56 |
| 2012/0009543 | A1 * | 1/2012 | Meier | A61C 3/02 433/165 |
| 2015/0147127 | A1 * | 5/2015 | Shpigelman | B23C 5/10 407/54 |
| 2016/0221094 | A1 * | 8/2016 | Wang | B23C 5/10 |
| 2017/0216936 | A1 * | 8/2017 | Dodds | B23C 5/10 |
| 2019/0299304 | A1 * | 10/2019 | Jia | B23C 5/165 |
| 2019/0344364 | A1 * | 11/2019 | Pittala | B23C 5/28 |
| 2020/0290134 | A1 | 9/2020 | Waki | |

FOREIGN PATENT DOCUMENTS

| | | | | |
|---|---|---|---|---|
| DE | 20105015 U1 * | 7/2001 | | A61C 3/02 |
| JP | 06335813 A * | 12/1994 | | |
| JP | H 09295214 A | 11/1997 | | |
| JP | H 10175112 A | 6/1998 | | |
| JP | H10263915 A | 10/1998 | | |
| JP | 2014-226747 A | 9/2017 | | |
| WO | WO 2019/215431 A1 | 11/2019 | | |

* cited by examiner

BURR

PRIORITY CLAIMS

This application claims priority to PCT application PCT/EP2021/055620 filed Sep. 10, 2021, which claims priority to German Patent Application Number 10 2020 106 105.6 filed Mar. 6, 2020.

FIELD OF THE INVENTION

The present invention concerns a burr according to the preamble of claim 1.

BACKGROUND OF THE INVENTION

Such burrs are also known as rotary files (the term "bur" is also used in English). According to the definition in DIN 8032/8033 and ANSI standard, they are used in hand-held tools or automated tools, driven in both cases by an electric motor or pneumatically. They are used for manual and automated (including guidance by means of a robot) grinding of metal surfaces by fine material removal.

Known burrs for the above-mentioned purpose have a shaft portion and a milling portion, which adjoins the shaft portion and ends at a free milling tip. At least the milling portion consists of hard metal, for example tungsten carbide. The shaft portion and the milling portion are rotationally symmetrical to an axis of rotation. The milling portion has a milling length and has a large number of cutters, which are separated by spaced-apart main flutes. For example, a typical number of main flutes for known burrs is 24 based on a 12.7 mm (½") burr. The main flutes have a flute depth, hereinafter referred to as main flute depth, and extend in a first twist direction with a first twist angle along the milling portion. Each of the cutters has a rake face and a relief face and a cutting edge at the transition between the rake face and the relief face, forming a rake angle and a relief angle. The first twist angle is measured between a tangent applied to the cutting edge and a line parallel to the axis of rotation. In each relief face, a plurality of chip breakers is provided, the chip breakers having a depth, hereinafter referred to as chip breaker depth, and extending helically in a second twist direction with a second twist angle along the milling portion. The second twist angle is measured between a tangent to the connecting line of adjacent but mutually obliquely offset chip breakers provided in successive relief faces and said parallel line to the axis of rotation. The first twist direction runs in the direction of rotation of the burr, while the second twist direction may run opposite to the first twist direction and thus also opposite to the direction of rotation of the burr; the second twist angle is then negative. Alternatively, the second twist direction can also run in the direction of rotation of the burr, in which case the second twist angle is positive.

The function of the chip breakers is on the one hand to control the chip formation and on the other hand to reduce the cutting resistance. If the chips can be broken into a favorable length, they do not wobble around the workpiece, vibrations are suppressed, and the probability of damage to the burr is reduced. A low cutting resistance prevents premature breakage of the cutting edge due to vibration. Low cutting resistance also helps reduce load and heat generation and can delay wear.

Well-known burrs of the above-mentioned type have the disadvantage that their cutting performance can hardly be increased without shortening their life too much. Up to now, no burrs have emerged which would optimally balance out the need for a high cutting action with a long life span.

It is the problem of the present invention to provide a burr with a high cutting performance and a long service life, i.e., low wear, at the same time. This problem is solved by a burr with the features of claim 1.

BRIEF DESCRIPTION OF THE INVENTION

A burr according to the invention is generally designed according to DIN 8032/8033 and ANSI standard.

Furthermore, the burr according to the invention with its milling portion consisting of hard metal is especially adapted to the machining of steel surfaces.

In the characterizing portion of claim 1, the term "in the region of the milling portion having the largest diameter" is used so that a uniform reference point is given even if the geometries of the burrs according to the invention differ. Thus, for example, the features according to the invention can be identified for both a cylindrical and a spherical milling portion. A somewhat less precise, but understandable to the skilled person, designation "body of the milling portion" could be chosen, especially to distinguish it from the region of the milling tip.

According to the invention, the chip breaker depth of an inventive burr in the region of the milling portion with the largest diameter is in the range between 5 and 25% of the main flute depth. Such a chip breaker depth is much smaller than known from the state of the art. A small chip breaker depth is accompanied by a relatively small chip breaker width (measured along the cutting edge) due to the manufacturing process. The technical effect achieved by these features is that a greater linear length of the main flutes is achieved compared to the known deeper and wider chip breaker depths. In the state of the art, chip breaker depths of up to 80% of the main flute depths are known.

Furthermore, according to the invention, the relief angle in the region of the milling portion with the largest diameter is in the range between 10° and 20°. It has turned out that such relief angles—in combination with the other features according to the invention—make the cutting edges more resistant and thus subject to less wear.

Further according to the invention the rake angle is between −3° and +14° in the region of the milling portion with the largest diameter. It has been found that this relatively small rake angle compared to known burrs contributes to the achievement of a good cutting performance and low wear.

Furthermore, the first twist angle is, according to the invention, greater than 25°. In combination with a reduced number of main flutes, this results in an increased main flute strength, so that a longer life span of the burr can be obtained. Also, by way of a relatively high first twist angle, more cutting edges will be in contact with the workpiece. Thus, the load on the cutting edges is reduced, and the surface finish of the workpiece is improved.

As a further measure in accordance with the invention, the number of main flutes is less than 15 and preferably not more than 12. This also results in a high cutting performance, whereby the interaction of all features of claim 1 results in surprisingly low wear of the milling portion, which should be at least partly attributed to the high strength of the main flutes.

When in the context of the present disclosure the expression "between value a and value b" is generally used, it is to be understood hereunder that the two end values a and b are also included.

The overall technical effect of all the features mentioned is that the burr according to the invention achieves a superior performance when the grinding process is started. Tests have shown that an increase in performance of 80% and more can be achieved when compared to known burrs. Even after a 40-minute grinding process, the grinding performance of tested inventive burrs is still about 30% better compared to conventional burrs. Surprisingly, this increase in performance does not come at the expense of the service life of the burrs according to the invention. The inventors assume that this unexpected effect is due in particular to the small chip breaker depth compared to the main flute depth (and the associated small width of the chip breaker along the cutting edge) and the small relief angle.

According to the above, an important feature of the invention's burr is that its chip breakers have a very small depth (and therefore width) compared to known milling burrs, while the purpose of the chip breakers, i.e., to break the chips during the grinding process, is maintained. Due to the small depth and the associated, production-related small width of the chip breakers, the linear length of the available cutting edge is maximized.

It has proven to be particularly advantageous if the chip breaker depth in the region of the milling portion with the largest diameter is in the range of 10% to 20% of the main flute depth.

Alternatively, additionally or supplementary, the chip breaker depth in the region of the milling portion with the largest diameter is preferably in the range between 0.1 and 0.25 mm and preferably not greater than 0.2 mm. Taking the above-mentioned preferred feature, i.e., the chip breaker depth is in the range between 10% and 20% of the main flute depth, as a reference value, the main flute depth is then between 0.5 and 2.5 mm. In exemplary designs, the chip breaker depth can be 0.1 mm for a main flute depth of 1 mm. With another exemplary design, the chip breaker depth is 0.2 mm for a main flute depth of 2 mm.

The chip breaker depth in the region of the milling portion with the largest diameter is advantageously not greater than the maximum width of the chip breakers (chip breaker width), measured along the cutting edge. Preferably, for example, the chip breaker width is twice as large as the chip breaker depth. Such a ratio of chip breaker width to chip breaker depth is achieved, for example, when a chip breaker wheel with a 90° angle is used.

The chip breakers are particularly preferred completely incorporated in the relief face, i.e., they do not protrude into the main flute or the subsequent chip space facing away from the direction of rotation.

Preferably, all chip breakers have a distance to the transition between the shaft portion and the milling portion and/or to the milling tip. This distance is for example and preferably at least 1 mm. This ensures that there is no weak point on the cutting edges which could break off if the distance between the chip breakers and the shaft portion or the milling tip, respectively, is too small.

It has proven to be very advantageous if the relief angle in the region of the milling portion with the largest diameter is in the range between 12° and 18°, particularly preferably between 13° and 15°. In combination with the other features of the invention's burr, the best results in terms of grinding performance and durability have been achieved.

Very good cutting performance with only low wear was achieved with a rake angle on the cutting edges in the range between 0° and +12°, whereby the range between +5° and +10° proved to be particularly favorable.

In accordance with advantageous designs, the relief faces in the region of the milling portion with the largest diameter have a width, measured in the direction of rotation of the burr, of 0.2 mm to 1 mm, preferably 0.4 to 0.8 mm.

The mentioned relief face, which starts directly at the respective cutting edge against the direction of rotation of the burr, is particularly preferred the only relief face created during the production of the main flutes. This relief face is also called "primary relief." A secondary relief face is, contrary to the direction of rotation of the bur, not adjacent to the relief face. Instead, the main flute with the corresponding chip space starts immediately after the (first) relief face. On the one hand, this design facilitates the production of the cutting edges or main flutes, and on the other hand, it has not been shown to be beneficial to provide an additional relief face.

As mentioned at the beginning, a usual size of the first twist angle for known burrs is 25°. According to the invention, the first twist angle is chosen to be larger and preferably larger than 27.5°. The first angle of twist is particularly preferred in the range between 29° and 32°, and particularly preferred at 30°.

The second twist angle, i.e., the pitch angle formed by the chip breakers, preferably has a smaller pitch than the first twist angle. It has proved to be advantageous if this is in the range between −75° and −88°, preferably between −78° and −85°, and particularly preferred between −80° and −82°. Alternatively, the second twist angle can be positive and is then preferably between +75° and +88°, preferably between +78° and +85°, and especially preferably between +80° and +82°.

With the burrs according to the invention, the first twist angle of all cutting edges and main flutes is preferably the same. However, designs within the scope of the invention are also possible in which the cutters and main flutes of at least two consecutive cutters (and main flutes) have a slightly different first twist angle. Moreover, the first twist angle is preferably constant along the milling length. It is also preferred if the second twist angle is also constant.

In general, variable first and/or second twist angles are possible. Variable first twist angles can be realized for one or more individual main flutes and/or between different main flutes. Regarding a variable second twist angle, one embodiment might have a pitch increasing from the shaft to the milling tip, for example. Other embodiments regarding a variable second twist angle are possible without limitation.

In the case of burrs according to the invention with a radius at the milling tip (whereby burrs with a cylindrical milling portion, for example, are not included here), advantageously, the two cutting edges of at least one pair of cutting edges, which run on opposite sides of the milling portion, merge into each other at the milling tip. In contrast to known burrs, in which the individual cutting edges end freely at the milling tip of the burr, at least two cutting edges form a common cutting edge at the milling tip of the burr in the said advantageous design. These two cutting edges of the said at least one pair preferably form an S-shape in the top view of the milling tip. The stability of the milling tip can thus be increased. It is also possible—to a small extent—to carry out cutting and drilling operations with the milling tip. It is also possible that, e.g., six cutting edges merge at the front tip in the center of the tool.

It is particularly preferred that the number of main flutes is smaller or equal to the largest diameter, measured in mm, of the milling portion. Accordingly, with regard to the cutting result—with low wear—it has proven positive that with a largest diameter of the milling portion of 6 mm, the number of main flutes is 5 to 7, preferably 6, with a largest diameter of the milling portion of 8 mm, the number of main flutes is 7 to 9, preferably 8, with a largest diameter of the milling portion of 10 mm, the number of main flutes is 9 to 11, preferably 10, with a largest diameter of the milling portion of 12 or 12.7 mm, the number of main flutes is 9 to 11, preferably 10, and/or with a largest diameter of the milling portion of 15 or 16 mm, the number of main flutes is 11 to 13, preferably 12.

For all the above mentioned specified lower and upper limits for parameter values, these are not to be considered as fixed pairs. For example, a preferred range of values might be one with a lower and an upper limit from different ranges stated above. For example, it is possible that a preferred chip breaker depth is between 5% (claim 1) and 20% (claim 2) of the main flute depth.

The milling portions of the burrs according to the invention can be coated with various coatings that contribute to a reduction of wear and an increase of life. Such special coatings may be, e.g., TiN, TiAlN, AlTiN, DLC, CH-NFE and CH-FEP.

It goes without saying that for different geometries of the milling portions, different numerical values with regard to above-mentioned physical parameters (twist angle, relief angle, rake angle, chip breaker depth, number of main flutes) within the claimed ranges will achieve an optimum result in each case with regard to cutting performance and service life of the burrs.

Further advantageous embodiments are characterized by the features of the sub-claims.

BRIEF DESCRIPTION OF THE DRAWINGS

In the following, the invention is explained in more detail using figures.

DETAILED DESCRIPTION OF THE INVENTION

Figure 1:
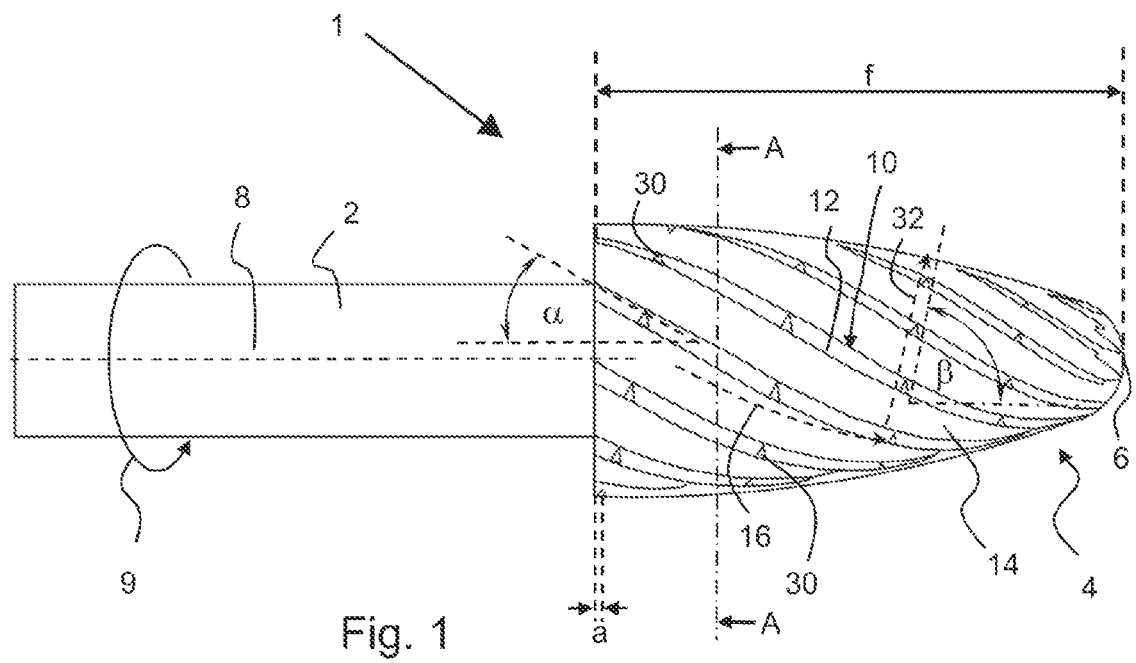
FIG. 1 is a side view of a burr according to the invention.

FIGS. 1-6 show a first design example of a burr 1 according to the invention. According to the side view of FIG. 1, a burr 1 has a cylindrical shaft portion 2 and an essentially conical, slightly outwardly curved milling portion 4, the latter having a milling length f and ending in a milling tip 6. The shaft portion 2 serves for fastening in a manually operated or automatic machine-operated tool which sets the shaft portion 2 and thus the entire burr 1 in rotation about a direction of rotation 9 in order to grind a metal workpiece. For this purpose the shaft portion 2 and the milling portion 4 are rotationally symmetrical to an axis of rotation 8.

At least the milling portion 4 consists of hard metal. The shaft portion 2 can also be made of hard metal (which is preferred) and is then preferably formed in one piece with the milling portion 4; alternatively, the shaft portion 2 is made of steel and is brazed to the milling portion 4, for example. The milling portion 4 can have different geometries. Instead of an essentially conical or tapered cross-section, the milling portion 4 can be designed with a constant or spherical cross-section. Many other shapes are possible, as well as mixed shapes, all of which are known to the skilled person.

In the milling portion 4, cutters 10 and main flutes 14 alternate in the direction of rotation 9 of the burr 1, whereby these cutters 10 and main flutes 14 run along the milling portion 4, seen in the direction of the milling tip 6, in a first twist direction 16 with a first, here constant, twist angle $\alpha$ of 30° (see FIG. 1). The first twist angle $\alpha$ is measured—in the region of the milling portion 4 with the largest diameter, in this case near the transition from the milling portion 4 to the shaft portion 2—between a tangent applied to the cutting edge 12 (see below) of a cutter 10 and a line parallel to the axis of rotation 8. The first twist direction 16 runs in the direction of rotation 9. The number of main flutes 14 is chosen low and is smaller than 15. In the design example shown, there are ten main flutes 14 and thus also ten cutters 10 (see FIG. 2).

According to the invention, the first twist angle $\alpha$ is greater than 25°, preferably greater than 27.5°, and is preferably in the range between 29° and 32°. The present figures show a particularly preferred design with a constant first twist angle $\alpha$ of 30°. Also possible are designs in which the at least two successive cutters 10 have a different first twist angle $\alpha$, for example a first twist angle $\alpha$ of 0.5°, 1°, or 2° different from each other.

Figure 2:
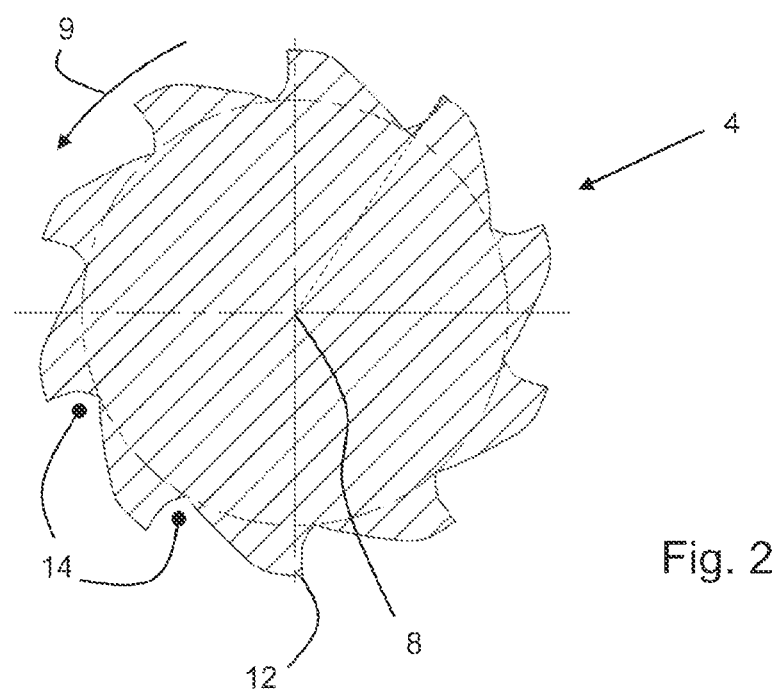
FIG. 2 is a cross-sectional view along A-A in FIG. 1.
Figure 3:
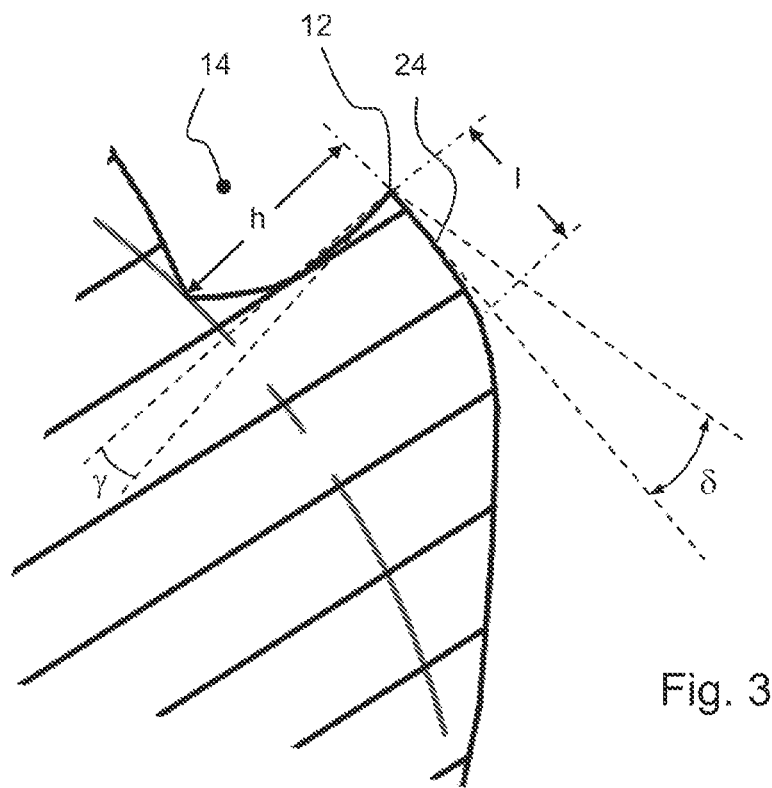
FIG. 3 is a detailed enlargement of FIG. 2.
Figure 4:
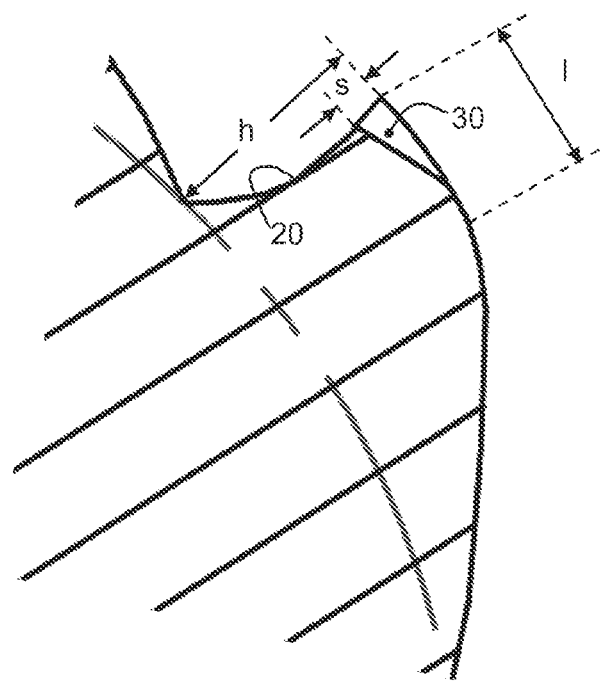
FIG. 4 is a cross-sectional view similar to FIG. 3, but here through a chip breaker.

As can be seen in particular in FIG. 2, each of the cutters 10 has a cutting edge 12. On the side of each cutting edge 12 facing the direction of rotation 9, there is a known rake face 20 which forms a rake angle $\gamma$ with a straight line perpendicular to and running through the axis of rotation 8 of burr 1 (see FIG. 3). On the side of each cutting edge 12 facing away from the direction of rotation 9, there is a relief face 24 (also called "primary relief") which forms a relief angle $\delta$ with a tangent to the cutting edge 12, this tangent being applied to an imaginary circle touching the cutting edges 12 (see FIG. 3). A further relief face (also called "secondary relief"), which would follow the first relief 24 against the direction of rotation 9, is not provided and is generally not preferred.

In the embodiment shown in the figures, the rake angle $\gamma$ is around 7° and is preferentially in the range between −3° and +14°, preferably in the range between 0° and +12° and especially preferably in the range between +5° and +10°.

Variable rake angles are also possible. Such variable rake angles can be realized for one or more individual cutters and/or between different cutters.

In the embodiment shown in the figures, the relief angle $\delta$ is around 15° and is, according to the invention, generally in the range between 10° and 20°, preferably between 12° and 18°, and particularly preferably between 13° and 15°. The relief face 24 preferably has a width l, measured in the direction of rotation 9 of the burr 1, of 0.2 mm to 1 mm, preferably of 0.4 to 0.8 mm.

For burrs having a defined front radius, which is true for the burr 1 shown in the FIGS. 1-6, the rake angle $\gamma$ at the milling tip of each cutter 10 preferably lies between −3° and 0°. Burrs without a defined end radius have, e.g., a cylindrical- or cone-shaped milling portion.

In each relief face 24 of the cutters 10 along their course, several chip breakers 30 are provided in the first twist direction 16. The chip breakers 30 each have a chip breaker depth s, which according to the invention is small compared to the main flute depth h (see FIG. 4). The chip breakers 30 of adjacent cutters 10 follow one another in the form of a helix, which runs in a second twist direction 32, which is opposite to the first twist direction 16 and thus also to the direction of rotation 9. The second twist angle is measured between a tangent to a connecting line of adjacent but obliquely offset chip breakers 30 provided in successive relief faces 24 and a line parallel to the axis of rotation 8. The second twist angle β is preferably constant, as in the shown embodiment.

The mentioned chip breaker depth s is, according to invention, in the range between 5 and 25% of the main flute depth h, preferably in the range between 10% and 20% of the main flute depth h. It has been found that such a chip breaker depth s, which is small in relation to the main flute depth h, has great advantages in terms of the effective cutting length of the cutters 10, increases the longevity and reduces the wear of the cutters 10, and yet effectively performs the main task of the chip breakers 30, namely, to improve chip control and at the same time reduce cutting resistance.

In the design example shown in the figures, the chip breaker depth s is approx. 17% of the main flute depth h.

Given in exemplary absolute numbers, the chip breaker depth s is preferably in the range between 0.1 and 0.25 mm. In one example, the chip breaker depth s is 0.1 mm with a main flute depth h of 1 mm. In another example, the chip breaker depth s is 0.2 mm for a main flute depth h of 2 mm. In these two examples the chip breaker depth is 10% of the main flute depth h. According to the percentage ranges given above, it is also possible if the chip breaker depth s is 0.2 mm with a main flute depth h of 1 mm, i.e., the ratio of the two depths is 20%.

The chip breaker width b (see FIG. 5), which is related to the chip breaker height h due to the manufacture of chip breakers 30 by means of cutting wheels known per se, is preferably greater than the chip breaker depth s and for example twice as great. For example, for a milling portion 4 with a 12 mm diameter, the chip breaker depth s can be 0.2 mm and the chip breaker width 0.4 mm.

The number of chip breakers 30 along a cutting edge 12 depends on the milling length f, the diameter of the milling portion 4, and/or the number of cutters 10. For example, the number of chip breakers 30 along a cutter 10 is between four and eight, for example five or six. In the design example shown, five chip breakers 30 are provided for each cutter 10.

Figure 5:
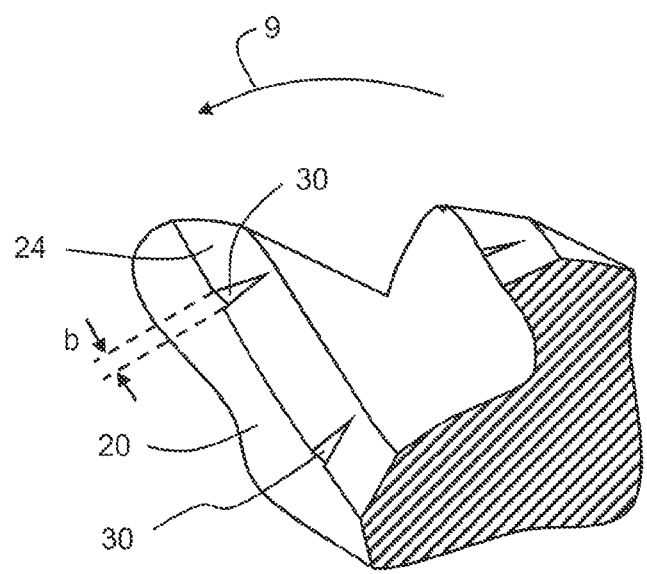
FIG. 5 is a perspective sectional view of the milling portion.

It is particularly advantageous if the chip breakers 30 run completely in the relief face 24 or are embedded in it, as can be seen in the perspective sectional view of FIG. 5.

It is preferred if chip breakers 30 have a distance a to the boundary region between the milling portion 4 and the shaft portion 2 (see FIG. 1), whereby this distance a is preferably at least 1 mm. It is also preferred if there is a corresponding distance between chip breakers 30 and the milling tip 6 (not drawn in, but recognizable in FIG. 6). Both measures serve to ensure that the effective length of a cutting edge 12 between a chip breaker 30 and the free end of the cutting edge 12 does not become too small, so that the risk of breaking this cutting edge section does not significantly increase when grinding or milling a workpiece.

The said second twist angle β formed by the chip breakers 30, which are provided in cutters 10 in succession in the opposite direction to the direction of rotation 9 and which run helically on the milling portion 4, is 81° in the embodiment shown in the figures, and generally is preferentially in the range between −75° and −88°, preferably between −78° and −85° and particularly preferably between −80° and −82°.

In the design example shown in the figures, the second twist angle β is negative; however, it can also be positive and advantageously lies between +75° and +88°, preferably between +78° and +85°, and particularly preferably between +80° and +82°. In this case, the first twist direction 16 and the second twist direction 32 both run in rotation direction 9.

Figure 6:
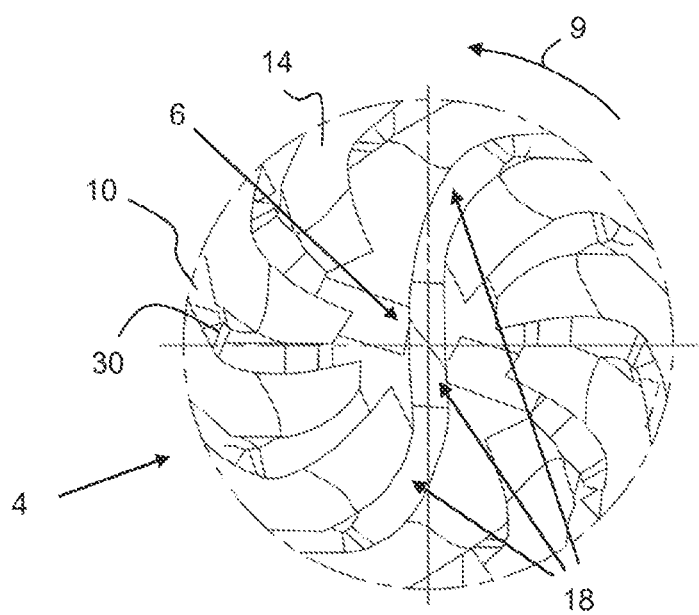
FIG. 6 is a top view of the burr.

As can be seen in particular from the plan view in FIG. 6, the cutters 10 of at least one pair of cutters 10, which run on opposite sides of the milling portion 4, merge into one another at the milling tip 6 and form an S-shape 18 in the plan view. Other cutters 10, which preferably run opposite each other on milling portion 4, can also merge into each other, so that, for example, four such cutters 10 form a cross shape (with curved arms) in plan view.

It has already been mentioned above that, according to invention, the number of main flutes 14 is chosen relatively small. In the design example shown in the figures, there are ten main flutes 14 and ten cutters 10, as explained above. It has proved to be advantageous if the number of main flutes 14 is less than or equal to the largest diameter of the milling portion 4, measured in mm.

The values given for the design example shown in the figures (in particular for the chip breaker depth s, the main flute depth h, the rake angle γ, the relief angle δ, the relief face 24) refer to the region of the milling portion 4 with the largest diameter, i.e., here to the region of transition between the milling portion 4 and the shaft portion 2. In this way a uniform reference point is given, which also applies to milling portions 4 with different geometry (for example spherical). A somewhat less precise, but also understandable for the skilled person, the designation "basic body of the milling portion 4" could be chosen, especially to distinguish it from the region of the milling tip 6.

LIST OF REFERENCE NUMBERS 1 burr
2 shaft portion
3 transition
4 milling portion
6 milling tip
8 axis of rotation
9 direction of rotation
10 cutters
12 cutting edge
14 main flutes
16 first twist direction
18 S-shape
20 rake face
24 relief face
30 chip breaker
32 second twist direction
f milling length
h main flute depth
s chip breaker depth
b chip breaker width
l relief face width
a distance
α first twist angle
β second twist angle
γ rake angle
δ relief angle

What is claimed is:

1. A burr for an electrically or pneumatically operated, hand-held, or automatically operated tool for milling a metal surface, comprising:

a shaft portion having an axis of rotation;

a milling portion adjoining the shaft portion and ending in a milling tip, wherein the milling portion defines a largest diameter and a milling length;

a plurality of cutters separated by a plurality of main flutes in the milling portion, wherein the plurality of main flutes have a main flute depth, and the plurality of cutters extend helically along the milling length in a first twist direction at a first twist angle α from the axis of rotation;

each cutter of the plurality of cutters has a cutting edge between a rake face and a relief face, wherein the rake face forms a rake angle γ from a line perpendicular to the axis of rotation, and the relief face forms a relief angle δ from a line tangent to the cutting edge;

a plurality of chip breakers incorporated in each relief face; the plurality of chip breakers intersecting with and extending from the cutting edge, to a position before reaching the main flute; wherein each chip breaker has a chip breaker depth, and chip breakers on adjacent cutters extend helically in a second twist direction with a second twist angle β from the axis of rotation; and at the largest diameter of the milling portion, the chip breaker depth is between 5 and 25 percent of the main flute depth, the rake angle γ is between −3 degrees and +14 degrees, the relief angle δ is between 10 degrees and 20 degrees, the first twist angle α is greater than 25 degrees, and the number of main flutes is less than 15.

2. The burr as in claim 1, wherein at the largest diameter of the milling portion, the chip breaker depth is between 10 percent and 20 percent of the main flute depth.

3. The burr as in claim 1, wherein at the largest diameter of the milling portion, the chip breaker depth is between 0.1 mm and 0.25 mm with the main flute depth between 0.5 mm and 2.5 mm.

4. The burr as in claim 1, wherein each chip breaker has a width measured along the cutting edge, and the chip breaker depth is less than or equal to the chip breaker width.

5. The burr as in claim 1, wherein the plurality of chip breakers are separated from the shaft portion by at least 1 mm.

6. The burr as in claim 1, wherein the plurality of chip breakers are separated from the milling tip by at least 1 mm.

7. The burr as in claim 1, wherein at the largest diameter of the milling portion, the relief angle δ is between 12 degrees and 18 degrees.

8. The burr as in claim 1, wherein at the largest diameter of the milling portion, the relief angle δ is between 13 degrees and 15 degrees.

9. The burr as in claim 1, wherein at the largest diameter of the milling portion, the rake angle γ is between 0 degrees and +12 degrees.

10. The burr as in claim 1, wherein at the largest diameter of the milling portion, the rake angle γ is between +5 degrees and +10 degrees.

11. The burr as in claim 1, wherein at the largest diameter of the milling portion, the relief face has a width of 0.2 mm to 1 mm.

12. The burr as in claim 1, wherein at the largest diameter of the milling portion, the relief face has a width of 0.4 mm to 0.8 mm.

13. The burr as in claim 1, wherein the first twist angle α is greater than 27.5 degrees.

14. The burr as in claim 1, wherein the first twist angle α is between 29 degrees and 32 degrees.

15. The burr as in claim 1, wherein the second twist angle β is between +75 degrees and +88 degrees.

16. The burr as in claim 1, wherein the second twist angle β is between +78 degrees and +85 degrees.

17. The burr as in claim 1, wherein the milling tip has a radius, and the cutting edges on opposite sides of the milling portion merge into one another at the milling tip.

18. The burr as in claim 1, wherein the cutting edges on opposite sides of the milling portion form an S-shape in a plan view of the milling tip.

19. The burr as in claim 1, wherein the number of main flutes is less than or equal to the largest diameter of the milling portion measured in mm.

20. The burr as in claim 1, wherein the burr satisfies one of the following: when the largest diameter of the milling portion is 6 mm, the number of flutes is 5 to 7; when the largest diameter of the milling portion is 8 mm, the number of flutes is 7 to 9; when the largest diameter of the milling portion is 10 mm, the number of main flutes is 9 to 11; and when the largest diameter of the milling portion is 12 or 12.7 mm, the number of flutes is 11 to 13.

21. The burr as in claim 1, wherein the plurality of chip breakers do not extend beyond the relief face.

* * * * *